(12) United States Patent
Boesjes (10) Patent No.: US 7,664,757 B1
(45) Date of Patent: Feb. 16, 2010

(54) MULTIPLY-INTEGRATED SYSTEM FOR PRODUCT INVENTORY, SALES, AND DISTRIBUTION

(76) Inventor: Eimar M. Boesjes, 1754 Moonshadow La., Eugene, OR (US) 97405

( * ) Notice: Subject to any disclaimer, the term of this patent is extended or adjusted under 35 U.S.C. 154(b) by 125 days.

(21) Appl. No.: 11/854,467

(22) Filed: Sep. 12, 2007

Related U.S. Application Data (62) Division of application No. 09/874,481, filed on Jun. 4, 2001, now Pat. No. 7,363,249.

(51) Int. Cl.
*G06F 17/00* (2006.01)
(52) U.S. Cl. ......................................... 707/10; 707/102
(58) Field of Classification Search ..................... 707/3, 707/10, 102, 104.1; 705/26–29, 37
See application file for complete search history.

(56) References Cited

U.S. PATENT DOCUMENTS

| | | | | |
|---|---|---|---|---|
| 6,263,317 B1 * | 7/2001 | Sharp et al. | .................... | 705/26 |
| 6,996,538 B2 * | 2/2006 | Lucas | ........................... | 705/28 |
| 7,203,477 B2 * | 4/2007 | Coppinger et al. | .......... | 455/403 |
| 7,203,485 B2 * | 4/2007 | Coppinger et al. | .......... | 455/418 |
| 7,254,390 B2 * | 8/2007 | Coppinger et al. | ....... | 455/432.3 |
| 7,286,815 B2 * | 10/2007 | Coppinger et al. | .......... | 455/406 |

* cited by examiner

*Primary Examiner*—Andrew Joseph Rudy
(74) *Attorney, Agent, or Firm*—David S. Alavi (57) ABSTRACT

A multiply-integrated system for inventory, sales, and distribution of products comprises a supplier database, an order database, and a programmed order processor. The supplier database includes inventory/pricing information for multiple independent participating product suppliers, which may include: product manufacturers, distributors, and/or retailers. The order database includes order information received by the multiple participating product suppliers from multiple independent product purchasers. The multiple product purchasers may include any or all of: product manufacturers, distributors, retailers, and/or purchasers. The order processor is linked to the databases and programmed for implementing a multiply-integrated method comprising the steps of: a) receiving/entering pricing/inventory information for the supplier database; b/c) receiving/entering order information for multiple product purchasers into the order database; d) searching for ordered products available from a supplier; e) issuing instructions for delivery of each ordered and located product; f) updating the order database; and g) creating a financial accounting record for delivered products.

15 Claims, 8 Drawing Sheets

MULTIPLY-INTEGRATED SYSTEM FOR PRODUCT INVENTORY, SALES, AND DISTRIBUTION

BENEFIT CLAIMS TO RELATED APPLICATIONS

This application is a divisional of U.S. non-provisional application Ser. No. 09/874,481 filed Jun. 4, 2001 now U.S. Pat. No. 7,363,249 in the name of Eimar M. Boesjes, said application being hereby incorporated by reference as if fully set forth herein.

FIELD OF THE INVENTION

The field of the present invention relates to systems for product inventory, sales, and distribution. In particular, systems and methods are described herein for multiply-integrated product inventory, sales, and distribution.

BACKGROUND

Figure 1A:
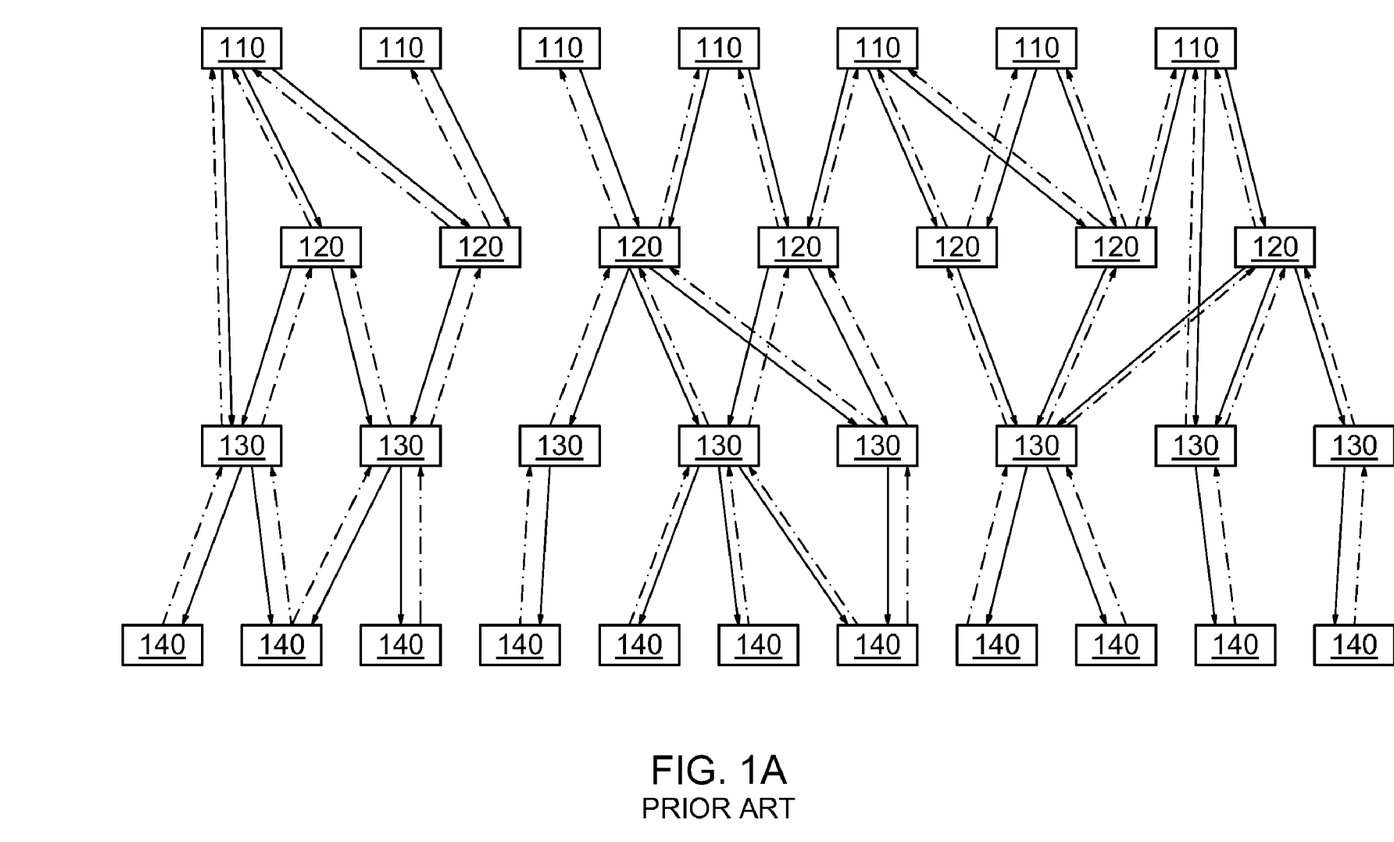
FIG. 1A is a schematic block diagram of a prior system for product inventory, sales, and distribution.
Figure 1B:
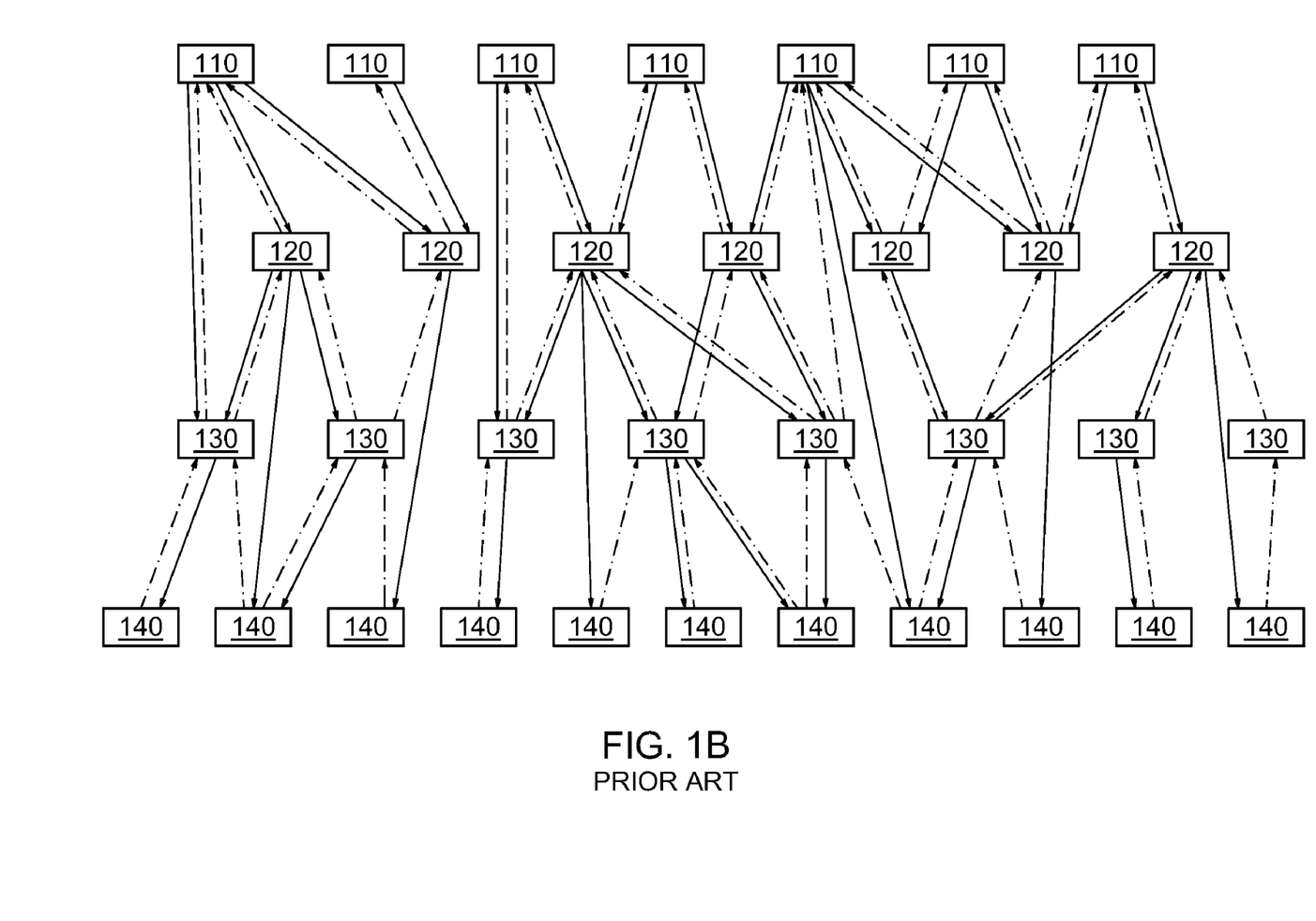
FIG. 1B is a schematic block diagram of a prior system for product inventory, sales, and distribution.

FIG. 1A is a schematic block diagram of a traditional system for inventory, sales, and distribution of products. Such a traditional system is vertically integrated and highly hierarchical, with most entities filling only limited roles in the overall system. Product manufacturers 110 are located at the top of the hierarchy, and send products primarily to distributors 120 and sometimes also to product retailers 130 as requested. The distributors 120 represent a primary repository for product inventory in the system. Some product retailers 130 may obtain product inventory directly from product manufacturers 110, but most typically obtain product inventory from product distributors 120 as required to maintain in-store stock (i.e., a "local inventory") in a physical store, and/or to ship to remotely-ordering (catalog, phone, online) retail product purchasers (remote inventory). Product retailers 130 are typically the primary interface between the system and a product purchaser 140 (typically a retail consumer). In some instances a product retailer 130 may arrange to have ordered products shipped directly from a product distributor 120 (i.e., from a "remote inventory") to a product purchaser 140 (either with or without the purchaser being aware of this). This variation of the traditional system is known as consumer direct fulfillment (CDF; FIG. 1B). Product manufacturers 110 may sometimes also offer consumer direct fulfillment.

As mentioned above, the traditional system for inventory, sales, and distribution of products is highly "vertically" integrated. Products predominantly flow downward through the hierarchy, while revenue flows predominantly upward. For a group of entities offering products within a common product category (i.e., music, video, books, software, clothing, furniture, sporting goods, and so on), each entity in the hierarchy typically does not interact with other members of the same level (no "horizontal" or "lateral" integration of the system), and typically interacts with only one or a few members of the one or two next higher levels (little "diagonal" integration). Traditional notions of competition in commerce tend to limit an entity's willingness to interact "horizontally". Each entity of the traditional system often plays only a single role (product manufacturer, product distributor, or product retailer) The systems of FIGS. 1A and 1B are somewhat static, and slow to respond to changing market conditions, sales trends, and/or product demand patterns. Each participating entity of the system (particularly the product retailers, especially individual local or regional retailers that are not part of a chain) has only limited opportunities for realizing improved economies of scale in its acquisition/inventory/sales/distribution of products, since its interactions with other entities in the system are typically limited.

Figure 1C:
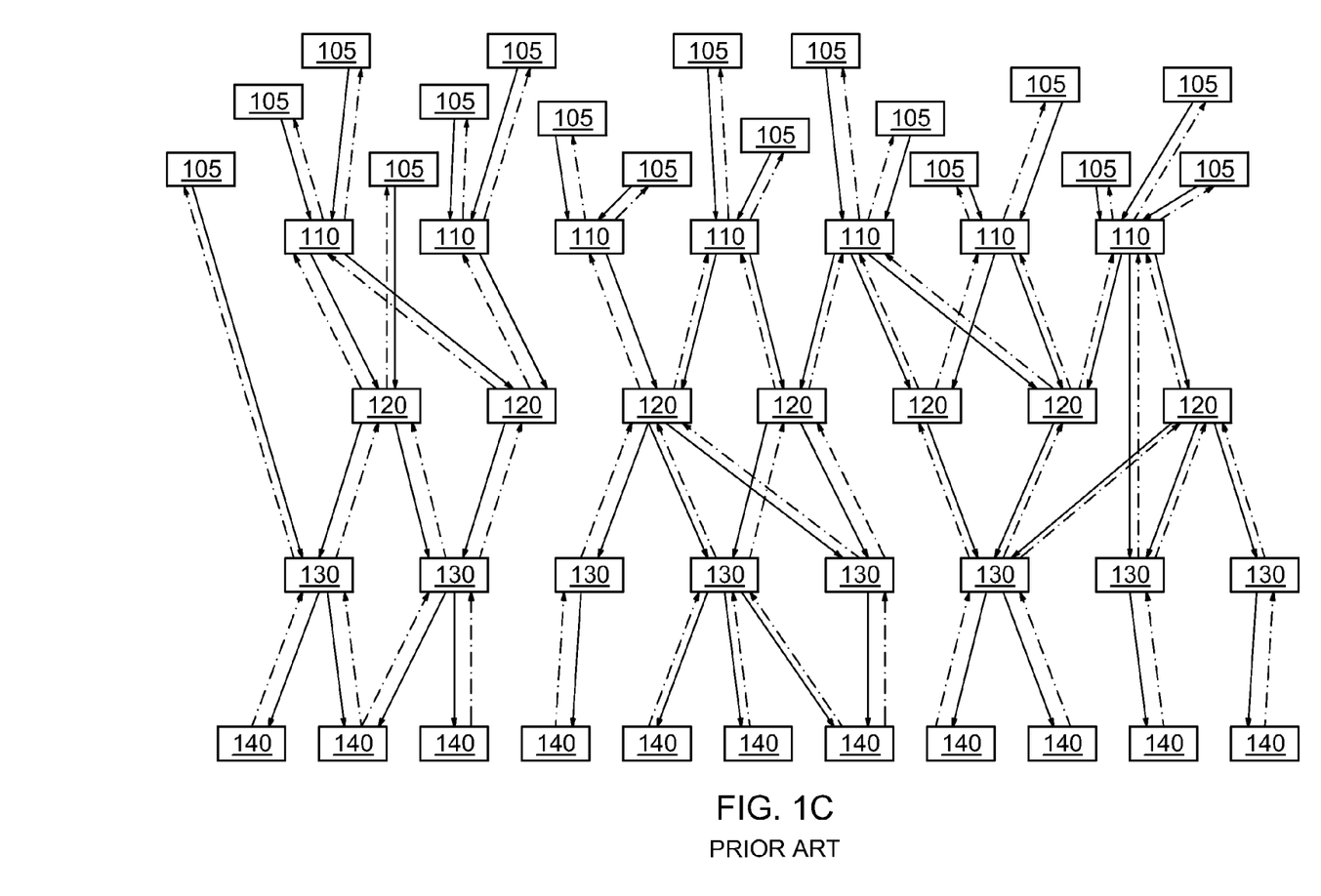
FIG. 1C is a schematic block diagram of a prior system for product inventory, sales, and distribution.
Figure 1D:
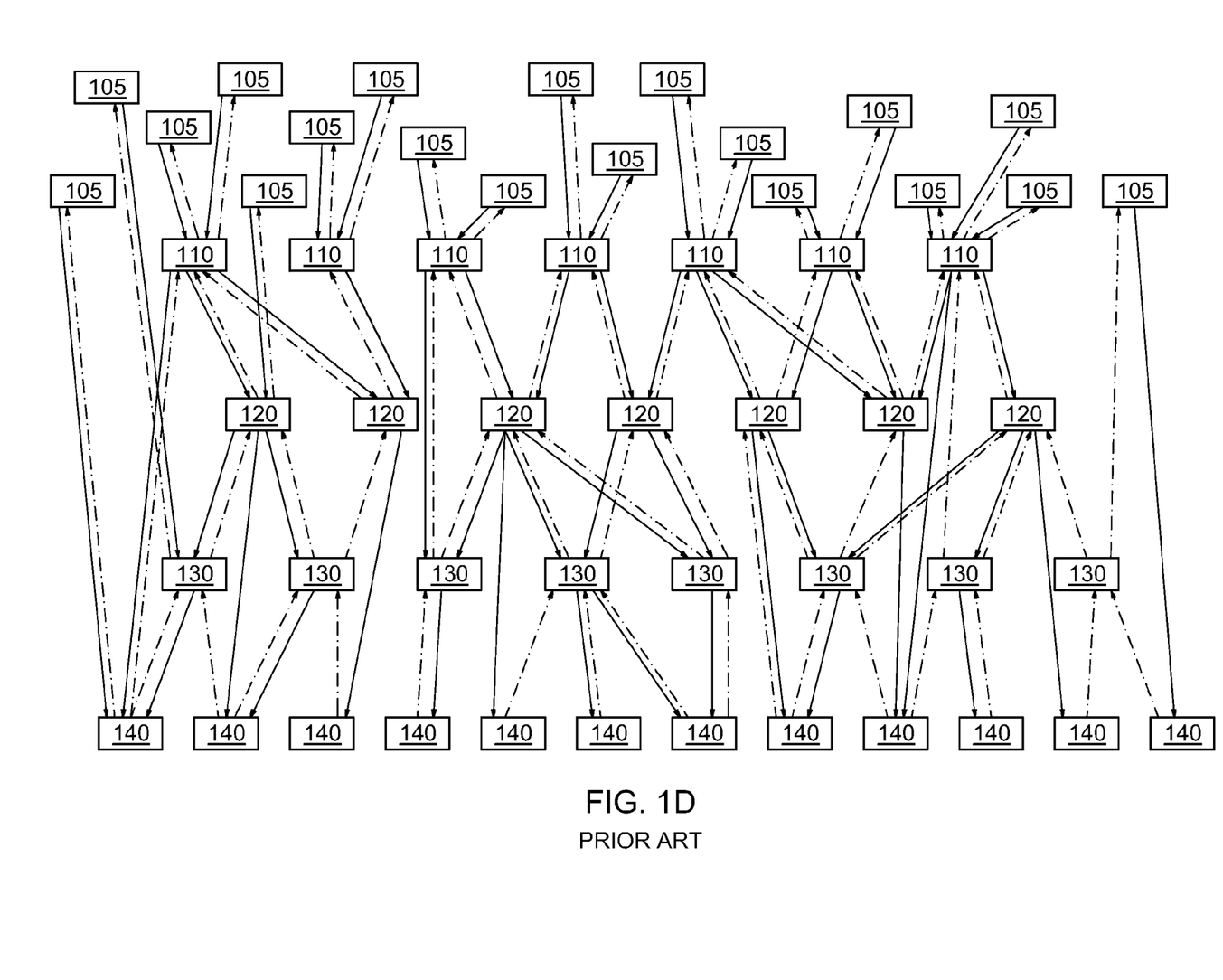
FIG. 1D is a schematic block diagram of a prior system for product inventory, sales, and distribution.

The somewhat modified traditional systems shown in FIGS. 1C and 1D are typical of the music, entertainment, and/or publishing industries, and include content providers 105 (i.e., musicians, studios, authors, production companies, and so on). In the publishing industry, publishing houses are product manufacturers 110 and represent authors (the content providers 105 in this example). Book wholesalers may serve as product distributors 120, and retail bookstores (physical and/or online) are the product retailers 130. Books and other publications flow down through the hierarchy, while revenue flows upward. One participating entity may participate at more than one level of the hierarchical system (publisher/wholesaler, distributor/retailer, publisher/retailer, or even publisher/distributor/retailer), but there are few if any "horizontal" exchanges or interactions in this scenario. Products eventually reach individual stores, which may comprise physical stores visited by retail customers to purchase and/or order published products, or may receive remotely-placed orders from customers via catalog, phone, or online (via Internet and so forth). Published-product purchasers 140 may obtain purchased products directly from a product retailer 130 (fulfillment from local inventory; FIG. 1C) or by "drop shipment" from a product distributor 120 (fulfillment from remote inventory; CDF; FIG. 1D). Manufacturers 110, distributors 120, or even content providers 105 may act directly as product retailers and/or offer consumer direct fulfillment, particularly in an online sales environment.

In the music/entertainment industry, a more complex situation exists. Musicians (content providers 105) are often associated with record labels, which in turn may operate independently or be associated with one of the roughly five major distribution houses (which form an oligopoly) or one of several secondary or regional distributors. The actual product to be sold (DVD, CD, tape, other media, digital file, and so forth) may be manufactured by the musician(s), the label, the major distribution house or other distributor, or even contracted out. Any of these entities may therefore serve as a product manufacturer, and/or may also serve as a product distributor. The product distributors 120 (independent label, distribution house, other distributor, etc) in turn ship products to individual record stores, which fill the role of product retailers 130. The record stores may be physical stores visited by retail customers to purchase (from local inventory) and/or order music products, and/or may receive remotely-placed orders from customers via catalog, phone, or online (via Internet and so forth). The retail store may fulfill orders itself (orders placed locally at a physical store or remotely; fulfillment from local inventory; FIG. 1C), or may have the ordered music products "drop shipped" directly from a distributor to the retail purchaser (fulfillment from remote inventory; CDF; FIG. 1D). The music purchaser need not be aware of the participation of the distributor. Music products flow downward through the hierarchy and revenue flows upward, with few if any "horizontal" exchanges between entities within the same level of the hierarchy. Similarly complex hierarchical relationships exist for other areas of the entertainment industries among studios, production companies, distributors, retail outlets, and so forth.

The existence of a significant market for used, rare, so-called private label, and/or other non-standard music products is an additional variation that may be imposed on the systems depicted in FIGS. 1C and 1D (often referred-to as "non-catalog" products in the music industry). Many local/regional retailers (but often not larger chains) will purchase used music products from retail customers. The inventory of used products available for retail re-sale is generally restricted to being offered only to purchasers within the reach of the acquiring retailer, with little or no opportunity for wider availability. Conversely, there is little or no opportunity for a local/regional retailer to offer a wider selection of used products than its own local inventory. Some local/regional retailers may enter into agreements with local/regional musicians to produce music products on a local/regional level and generally offered for sale only from the local inventory of the local/regional retailer. Few opportunities exist for a retailer to offer such so-called private-label products of other retailers. Similar limitations are encountered when offering out-of-production, collectible, rare, or otherwise non-standard products.

It is therefore desirable to provide systems and methods for providing multiply-integrated product inventory, sales, and distribution. A "multiply-integrated system" is meant to include "vertical" (between participants in differing levels), "horizontal" (between participants within the same level), and "diagonal" (between a participant of a level and many participants in other levels) interactions between participants in the system, wherein each participant offers products for distribution and/or sale within a common product category or class (examples: a group of participating music/video suppliers; a group of participating book/magazine suppliers; a group of participating furniture suppliers; a group of participating software suppliers; a group of participating sporting goods suppliers; and so forth). It is desirable to provide multiply-integrated systems and methods wherein product identification, product inventory, product pricing, order, and/or sales information for multiple participants in the system is gathered into system databases for enabling integration of the system. It is desirable to provide a multiply-integrated system for inventory, sales, and distribution of products wherein any participant in the system may act in multiple capacities within the system (i.e., as a product manufacturer, a product distributor, and/or a product retailer). It is desirable to provide multiply-integrated systems and methods for enabling exchanges of products and/or revenues between any participants in the system, including "horizontal" exchanges. It is desirable to provide multiply-integrated systems enabling participants in any level of the hierarchical system to accept orders from product purchasers. It is desirable to provide multiply-integrated systems and methods enabling participants in any level of the hierarchical system to provide consumer fulfillment (direct or indirect) for orders placed with participants in any hierarchical level, particularly retailer-to-retailer consumer fulfillment. It is desirable to provide multiply-integrated systems and methods enabling rapid adjustment of product inventory (local and/or remote inventory) and/or product pricing to changing market conditions, sales trends, and/or product demand patterns. It is desirable to provide multiply-integrated systems and methods enabling participants in the system, particularly product retailers, to realize improved economies of scale. It is desirable to provide multiply-integrated systems and methods to enable a participant in the system to pool inventories and/or orders of physical and online operations in real time to leverage improvements in efficiencies in the system. It is desirable to provide multiply-integrated systems and methods to enable multiple participants in the system to pool inventories and/or orders in real time to leverage improvements in efficiencies in the system. It is desirable to provide multiply-integrated systems and methods enabling real-time automated order fulfillment, pricing adjustments, inventory adjustments, and/or other adjustments to the distribution and/or flow of products and revenue to/from/within the system. It is desirable to provide multiply-integrated systems and methods enabling a participant in the system to selectively interact with other participants in the system. It is desirable to provide multiply-integrated systems and methods enabling a participant in the system to maintain independence and autonomy. It is desirable to provide multiply-integrated systems and methods enabling participants, particularly local/regional product retailers, to offer a wider array of non-standard products, and to offer their own non-standard products to a wider group of potential purchasers.

SUMMARY

Certain aspects of the present invention may overcome one or more aforementioned drawbacks of the previous art and/or advance the state-of-the-art of systems for product inventory, sales, and distribution, and in addition may meet one or more of the following objects:

To provide systems and methods for providing multiply-integrated product inventory, sales, and distribution for participating product suppliers each offering products of a common product category or class;

To provide multiply-integrated systems and methods wherein inventory, pricing, order, and/or sales information for multiple participants in the system is gathered into system databases for enabling integration of the system;

To provide a multiply-integrated system for inventory, sales, and distribution of products wherein any participant in the system may act in multiple capacities within the system (i.e., as a product manufacturer, a product distributor, and/or a product retailer;

To provide multiply-integrated systems and methods for enabling exchanges of products and/or revenues between any participants in the system, including "horizontal" exchanges;

To provide multiply-integrated systems enabling participants in any level of the hierarchical system to accept orders from product purchasers;

To provide multiply-integrated systems and methods enabling participants in any level of the hierarchical system to provide consumer direct fulfillment for orders placed with participants in any hierarchical level, particularly retailer-to-retailer consumer fulfillment;

To provide multiply-integrated systems and methods enabling rapid adjustment of inventory and/or pricing to changing market conditions, sales trends, and/or product demand patterns;

To provide multiply-integrated systems and methods enabling participants in the system, particularly product retailers, to realize improved economies of scale;

To provide multiply-integrated systems and methods to enable a participant in the system to pool inventories and/or orders of physical and online operations in real time to leverage improvements in efficiencies in the system;

To provide multiply-integrated systems and methods to enable multiple participants in the system to pool inventories and/or orders in real time to leverage improvements in efficiencies in the system;

To provide multiply-integrated systems and methods enabling real-time automated order fulfillment, pricing adjustments, inventory adjustments, and/or other adjustments to the distribution and/or flow of products and revenue to/from/within the system;

To provide multiply-integrated systems and methods enabling a participant in the system to selectively interact with other participants in the system;

To provide multiply-integrated systems and methods enabling a participant in the system to maintain independence and autonomy; and To provide multiply-integrated systems and methods enabling participants, particularly product retailers, to offer a wider array of non-standard products, and to offer their own non-standard products to a wider group of potential purchasers.

One or more of the foregoing objects may be achieved in the present invention by a system comprising a supplier database, an order database, and a programmed order processor. The supplier database includes product identifying information, product inventory information, and product pricing information for multiple independent participating product suppliers, which may include any or all of: participating product manufacturers, participating product distributors, and/or participating product retailers. It may be particularly desirable to include product retailers among the multiple participating product suppliers. Each of the participating product suppliers offers products of a common product category or class. The order database includes order information pertaining to orders received by the multiple participating product suppliers from multiple independent product purchasers, both pending and fulfilled. The multiple product purchasers may include any or all of: participating product manufacturers, participating product distributors, participating product retailers, non-participating product manufacturers, non-participating product distributors, non-participating product retailers, and/or retail product purchasers. The order processor is operatively linked to the databases and programmed for implementing a multiply-integrated method for inventory, sale, and distribution of products according to the present invention.

One or more of the foregoing objects may be achieved in the present invention by said multiply-integrated method, comprising the steps of: a) automatically receiving product identifying information, product pricing information, and product inventory information from the multiple participating product suppliers and entering the information into the supplier database; b) automatically receiving, from multiple participating product suppliers, order information pertaining to orders placed by multiple product purchasers with the multiple participating product suppliers; c) automatically entering the received order information into the order database; d) automatically searching, for each order placed by each product purchaser, the supplier database to attempt to locate each ordered product listed in the placed order and available for delivery from a corresponding participating product supplier; e) automatically issuing instructions for delivery, for each order placed by each product purchaser, of each ordered and located product to the product purchaser from the corresponding participating product supplier, thereby fulfilling the order; f) automatically updating order information in the order database pertaining to each delivered product; g) automatically updating product inventory in the supplier database pertaining to each delivered product; and h) creating a financial accounting record for each delivered product.

Implementation of systems and methods according to the present invention relaxes the rigid vertically-integrated hierarchical product distribution system depicted in FIGS. 1A-1D to yield a multiply-integrated product inventory, sale, and distribution. "Multiply-integrated" here is meant to include vertical, horizontal, and "diagonal" interactions between participants within the system. Product inventory and revenue may flow between any participating product suppliers under the present invention. Orders placed with one participating product supplier may be fulfilled by any other participating product supplier. Multiple product retailers offering used or otherwise non-standard products may thereby offer a wider inventory of such products to a wider group of potential purchasers. Local inventories of the participating suppliers may be dynamically redistributed according to the immediate demands made of the system. Participating product suppliers may realize improved economies of scale, and the system may pool or aggregate inventories and/or orders to leverage improved efficiencies in the system.

Additional objects and advantages of the present invention may become apparent upon referring to the preferred and alternative embodiments of the present invention as illustrated in the drawings and described in the following written description and/or claims.

BRIEF DESCRIPTION OF THE DRAWINGS

In each of the Figures, different line styles with arrows are use to indicate the flow of order information (dashed lines with arrows), product (solid lines with arrows), and revenue (dot-dashed lines with arrows).

DETAILED DESCRIPTION OF PREFERRED AND ALTERNATIVE EMBODIMENTS

For purposes of the present written description and/or claims, the term "system" shall generally denote an apparatus for multiply-integrated product inventory, sales, and distribution according to the present invention, and may also include methods implemented using such an apparatus. For purposes of the present written description and/or claims, the term "online" shall denote an activity which is performed by sending and/or receiving text, data, images, graphics, commands, requests, queries, and so forth over a communications network through an interface device. This may preferably mean using a computer connected to the Internet, but may also include other interface devices (including but not limited to: computers, workstations, terminals, televisions, wireless devices, hand-held or "palm-top" devices, electronic organizers, telephones, wireless telephones, messaging units, and the like; combinations thereof; and/or functional equivalents thereof) and other networks (Internet, Internet 2, next-generation Internet, other successors to the Internet, World-Wide Web, telephone networks, local- or wide-area networks, wireless networks, optical networks, satellite-based networks, and the like; combinations thereof; and/or functional equivalents thereof).

Figure 2:
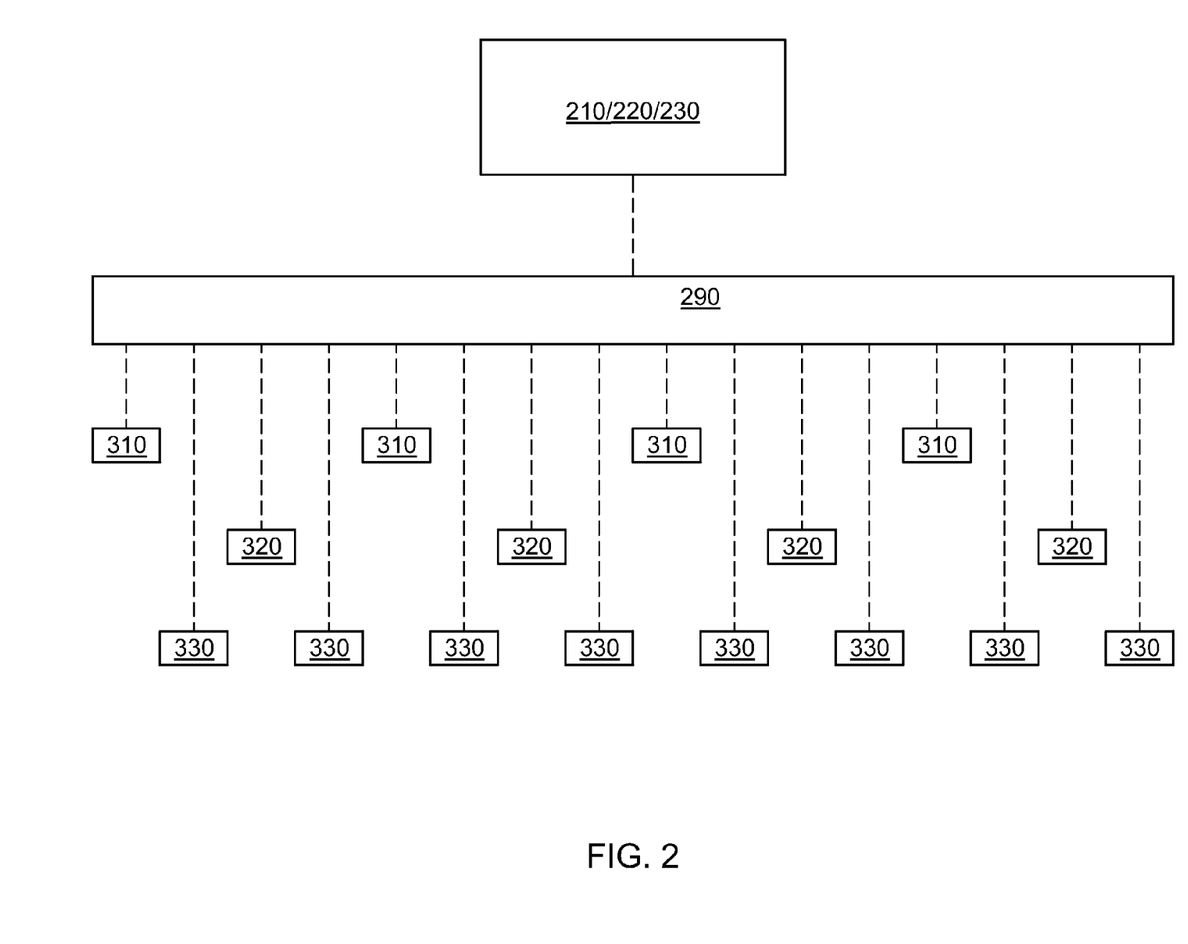
FIG. 2 is a schematic block diagram of a multiply-integrated system for product inventory, sales, and distribution according to the present invention.

FIG. 2 is a schematic block diagram of a multiply-integrated system for product inventory, sales, and distribution according to the present invention, comprising a supplier database 210, an order database 220, and programmed processor 230 operatively linked to the databases 210 and 220. The supplier database 210 includes product identifying information, product inventory information, and product pricing information for multiple independent participating product suppliers, which may include any or all of: participating product manufacturers, participating product distributors, and/or participating product retailers. It may be particularly desirable to include multiple product retailers among the multiple participating product suppliers. Each of the multiple independent participating product suppliers offers products of a common product category or class. Each member of a chain or group of commonly-owned or commonly-franchised product retailers shall not be considered independent within the scope of inventive concepts disclosed and/or claimed herein, but rather each such chain or group shall be collectively designated a single participating entity within the scope of inventive concepts disclosed and/or claimed herein. The order database 220 includes order information pertaining to orders received by the multiple participating product suppliers from multiple independent product purchasers, both pending and fulfilled. The multiple product purchasers may include any or all of: participating product manufacturers, participating product distributors, participating product retailers, non-participating product manufacturers, non-participating product distributors, non-participating product retailers, and/or retail product purchasers. The order processor 230 is operatively linked to the databases and programmed for implementing multiply-integrated methods for inventory, sale, and distribution of products according to the present invention.

Databases 210 and 220 may preferably comprise digitally encoded and stored data corresponding to order information, product identifying information, product inventory information, product pricing information, as well as other pertinent information such as product supplier name, location, mailing and/or shipping address, Internet/Web address, email address, and so forth for each of the multiple independent product suppliers, and similar information for product purchasers. Product inventory and/or product pricing information may preferably stored in the supplier database in a search table common to the multiple participating product suppliers. The databases may be stored on any suitable medium or combination of media and preferably include one or more connections, links, and/or interfaces enabling users of the system to access the information in the databases via the programmed processor 230. The system preferably includes a user interface and appropriate data links to enable participating product suppliers and purchasers to interact with the system through processor 230 and implement the methods according to the present invention. In FIG. 2 processor 230 is shown linked to a communications network 290 to enable online access by participating product suppliers and participating product purchasers to the system (i.e., participating product manufacturers 310, participating product distributors 320, and/or participating product retailers 330). Product content providers (not shown) may also be linked to the system.

Figure 3:
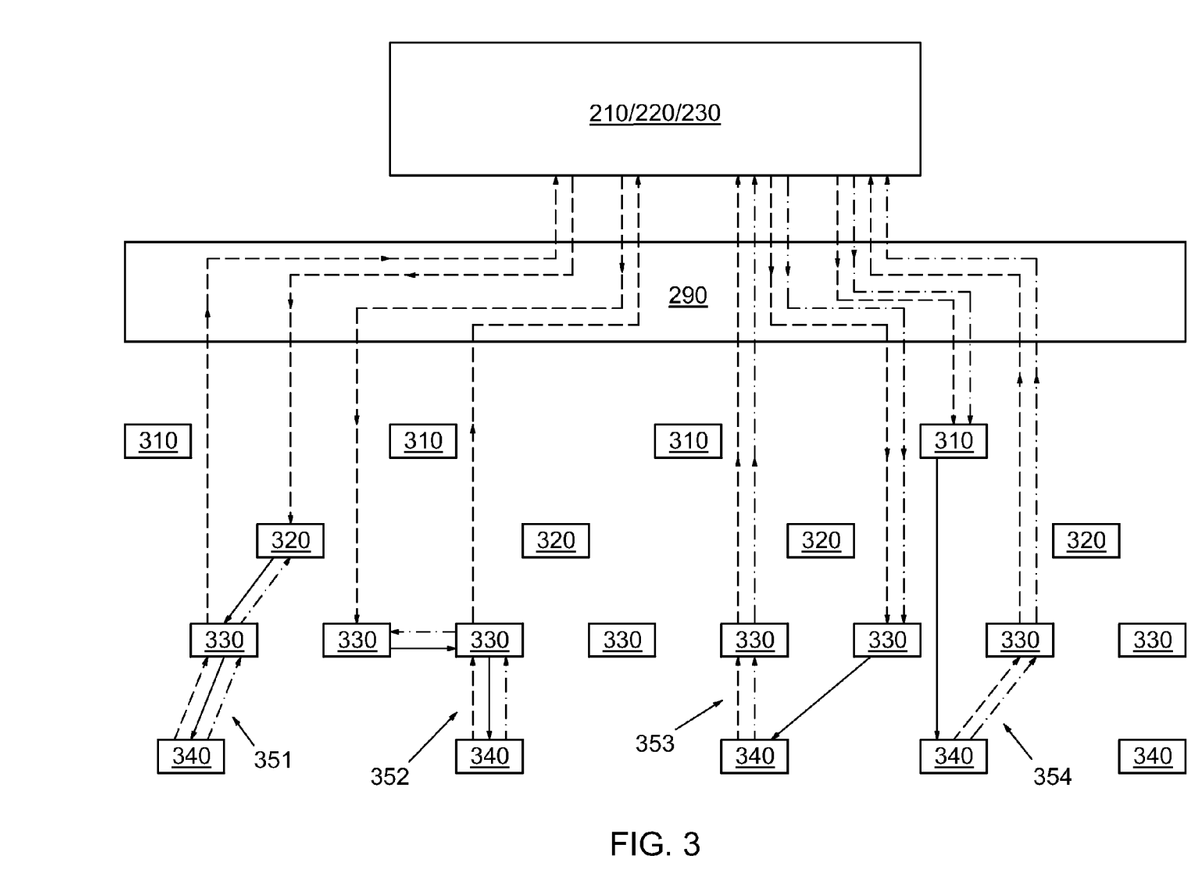
FIG. 3 is a schematic process diagram of multiply-integrated systems and methods for product inventory, sales, and distribution according to the present invention.
Figure 4:
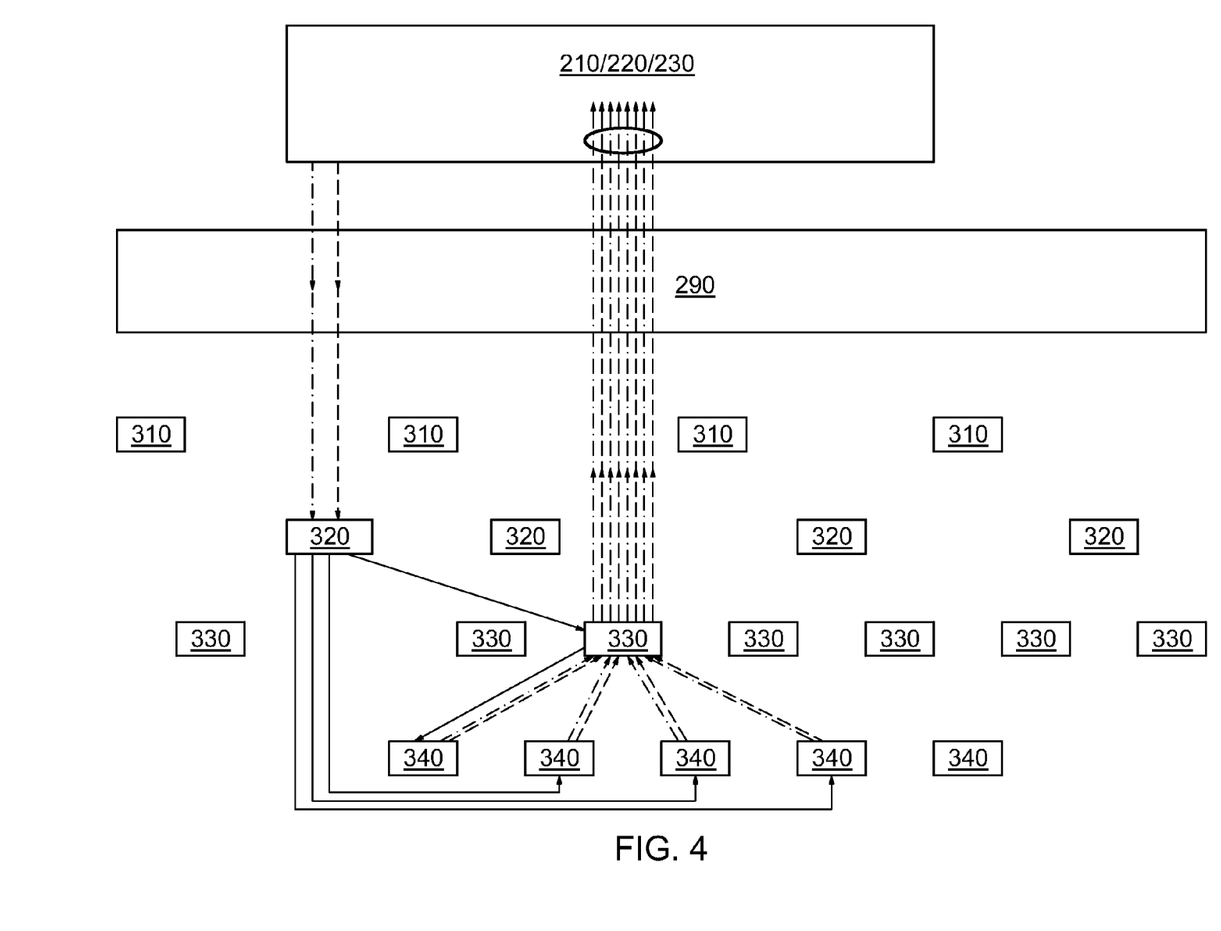
FIG. 4 is a schematic process diagram of multiply-integrated systems and methods for product inventory, sales, and distribution according to the present invention.
Figure 5:
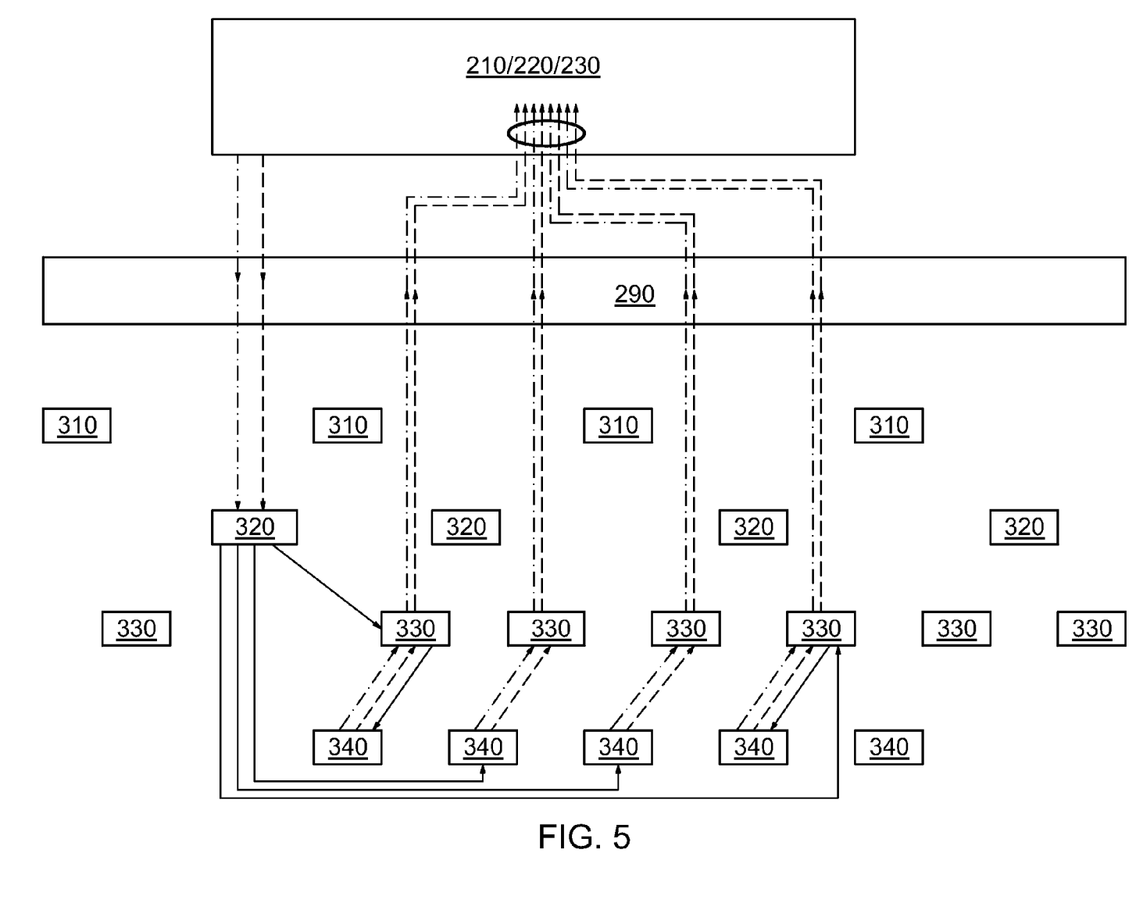
FIG. 5 is a schematic process diagram of multiply-integrated systems and methods for product inventory, sales, and distribution according to the present invention.

FIGS. 3 through 5 are schematic process diagrams illustrating various multiply-integrated methods of inventory, sale, and distribution of products according to the present invention. "Multiply-integrated" herein is meant to include "vertical" (between participants in differing levels), "horizontal" (between participants within the same level), and "diagonal" (between a participant of a level and many participants in other levels) interactions between participants in the system. Each participating product supplier offers products of a common product category or class. A preferred method may comprise the steps of: a) automatically receiving product identifying information, product pricing information, and product inventory information from the multiple participating product suppliers, which may include any or all of participating product content providers (not shown), participating product manufacturers 310, participating product distributors 320, and/or participating product retailers 330, and entering the information into the supplier database 210; b) automatically receiving, from multiple participating product suppliers, order information pertaining to orders placed by multiple product purchasers 340 (which may include any or all of: participating product manufacturers, participating product distributors, participating product retailers, non-participating product manufacturers, non-participating product distributors, non-participating product retailers, and/or retail product purchasers) with the multiple participating product suppliers; c) automatically entering the received order information into the order database 220; d) automatically searching, for each order placed by each product purchaser 340, the supplier database 210 to attempt to locate each ordered product listed in the placed order and available for delivery from a corresponding participating product supplier; e) automatically issuing instructions for delivery, for each order placed by each product purchaser, of each ordered and located product to the product purchaser from the corresponding participating product supplier, thereby fulfilling the order; f) automatically updating order information in the order database 220 pertaining to each delivered product; g) automatically updating the product inventory information pertaining to each delivered product in the supplier database; and h) creating a financial accounting record for each delivered product (representing a flow of revenue).

The gathering from all participating product suppliers (each offering products of a common product category or class) of order, product inventory, and product pricing information into common databases and/or common search tables enables any participating product supplier (including product content providers and particularly including product retailers) to assume any role within the system (i.e., product manufacturer 310, product distributor 320, and/or product retailer 330). Systems and methods implemented according to the present invention may enable exchanges of products and/or revenues between any participating product suppliers, and may facilitate exchanges between a participating product supplier and substantially more other participating product suppliers than was possible under prior systems of product inventory, sales, and distribution. A significant and desirable feature of systems and methods implemented according to the present invention may be the enablement of "horizontal" exchanges among participating product suppliers, particularly among participating product retailers ("retailer-to-retailer" exchanges). The commercial interactions enabled by systems and methods implemented according to the present invention move substantially beyond mere "co-marketing" agreements to virtually integrate the local product inventories of the participating product suppliers.

Systems and methods according to the present invention may be particularly suitable for implementation for inventory, sale, and distribution of products in the music, entertainment, publishing, and/or software fields for distributing music, movies, video programming, books, magazines, other printed publications, games, programs, data compilations, and other content on CDs, audio and/or video tapes, DVDs, magnetic media, printed media, and other suitable media. For implementation of systems and methods according to the present invention in the fields of music, entertainment, publishing, and/or software, the multiple independent participating product suppliers may further include product content providers (not shown), including musicians (solo artists and groups), studios, production companies, actors, actresses, composers, arrangers, writers, authors, editors, compilers, researchers, and so forth.

Delivery of an ordered product (i.e., order fulfillment) may be achieved in several ways according to the present invention, as illustrated in FIG. 3. Once a product ordered by a purchaser 340 (typically a retail purchaser, but may also be any participating or non-participating product supplier) has been located in the local inventory of a corresponding product supplier, the ordered and located product may be shipped to the product supplier 330 that originally received the order (consumer indirect fulfillment; transactions 351 and 352 of FIG. 3). The receiving product supplier may then ship the product to the product purchaser, or may send a notification to the purchaser that the product is ready to be picked up. Such a notification may be automatically generated by the system. Alternatively, the ordered and located product may be shipped directly from the corresponding product supplier to the product purchaser (consumer direct fulfillment; transactions 353 and 354 of FIG. 3). This may be done with or without the knowledge of the product purchaser. Concealment of the identity of the fulfilling participating product supplier may be preferred, as well as limiting access of the fulfilling participating product supplier to the identity of the product purchaser. A particularly significant implementation of systems and methods according to the present invention comprises fulfillment (direct or indirect) of orders received by a first product retailer and fulfilled by a second product retailer (retailer-to-retailer consumer fulfillment; transactions 352 and 353 of FIG. 3). Revenue may be transferred directly between the order-receiving and fulfilling product suppliers (transactions 351 and 352 of FIG. 3) or may be transferred indirectly through mediation of the system 210/220/230 (transactions 353 and 354 of FIG. 3). This latter method for handling revenue flow/financial transactions may be preferred, and shifts the burdens associated with revenue collection and financial verifications from the individual participants to the system. Indirect system-mediated financial transactions may also enable system participants to conceal their identities from other participants (discussed further hereinbelow). While the example transactions of FIG. 3 (and FIGS. 4 and 5 described hereinbelow) all involve orders initially placed with a product retailer 330, transactions involving orders initially placed with other participating product suppliers are also within the scope of the system and methods implemented according to the present invention.

Systems and methods implemented according to the present invention may provide any individual participating product retailer (or other participating product supplier) with a remote product inventory that may include the collective local product inventories of many or all of the other participating product retailers (and/or many or all of the other participating product suppliers). This potentially vast increase in product inventory comes without the accompanying expense to the individual product retailer of maintaining the entire collective inventory locally. The system according to the present invention may therefore enable a collection of perhaps a few dozen individual local/regional product retailers to provide product offerings as wide as a national chain or a large online retailer. Conversely, systems and methods according to the present invention may enable a participating product supplier, particularly a local/regional retailer, to offer its local inventory to a wider audience of product purchasers, since the participating product supplier may gain access to a geographically far-flung inventory, sales, and distribution system.

Systems and methods implemented according to the present invention may enable participating product suppliers, and in particular participating product retailers, to realize efficiencies and/or economies of scale that could not be achieved individually.

To achieve operating efficiencies, the system may be programmed to automatically select for fulfilling each order an optimum product supplier available. The figures-of-merit used to select a supplier may include product availability, product price, speed of delivery, shipping/handling fees, and so forth, and may be made available from the supplier database. The system may be further programmed to enable each participating product supplier to independently select which figure(s)-of-merit to consider and target values for those figure(s)-of-merit to be used in selecting fulfilling product suppliers.

To achieve economies of scale, order information pertaining to multiple orders received by a product supplier (particularly a product retailer) may be aggregated, and the product supplier database searched in real time for an optimum source (in terms of price, shipping costs, availability/timeliness, and/or other figure-of-merit; as discussed hereinabove) among the participating product suppliers, as in the example depicted in FIG. 4. While a product distributor 320 is shown as the optimum source for fulfilling multiple orders received by a product retailer 330 in FIG. 4, aggregated orders from any participating product supplier may be fulfilled by any of the participating suppliers as the optimum source, including product retailers. Multiple orders placed at multiple locations of a product supplier, or at a physical location and an online presence of a product supplier (or otherwise remotely placed), may be aggregated in a similar fashion. Both products for fulfillment of orders and products for maintaining/replenishing local inventory for later shipment or direct sales may be aggregated in order to find an optimum product source. Even more significantly, local inventory replenishment and order fulfillment information from multiple orders from multiple product suppliers (especially from multiple product retailers) may be automatically aggregated in real time, and the system databases searched for an optimum source of products, as in the example depicted in FIG. 5. While a product distributor 320 is shown as the optimum source for fulfilling multiple orders received by multiple product retailers 330 in FIG. 5, aggregated orders from any grouping of multiple participating product suppliers may be fulfilled by any of the participating suppliers as the optimum source, including product retailers. The larger number of products in such a multiple-provider aggregated order may often result in a lower unit cost for the product and/or other more favorable terms, and may not have been available to a single product supplier searching for smaller quantities. Carrying this concept further, product suppliers may actively bid to fulfill orders (individual or aggregated) in real time, with the optimum bid selected for fulfillment. Order aggregation as described above (particularly aggregation from multiple product suppliers) provides incentives for potentially-fulfilling product suppliers to bid to fulfill orders at more favorable terms (lower price, faster delivery, lower shipping/handling fees, and so forth).

While there are clear advantages to the various order-aggregation schemes enabled by the present invention and described above, it is also important to enable individual product suppliers (including product retailers) to maintain independence and autonomy. Systems and methods implemented according to the present invention preferably enable competing participating product suppliers to work together without comprising their respective market positions. Systems and methods implemented according to the present invention may therefore enable a participating product supplier to specify an eligible subset among the participating product suppliers for aggregating orders. For example, a product retailer may not wish to aggregate orders with a local rival, but aggregating orders with a retailer in another state may be acceptable. The system may be programmed to automatically take such selections into account when attempting to aggregate orders originating from multiple product suppliers.

Similarly, systems and methods implemented according to the present invention may enable: a first participating product supplier to select an eligible subset of the multiple participating product suppliers from which ordered products, listed in orders placed with the first participating supplier, may be delivered to a product purchaser; and a first participating product supplier to select an eligible subset of the multiple participating product suppliers for which ordered products, listed in orders placed with the eligible subset of the multiple participating product suppliers, are available for delivery to a product purchaser. For example, a product retailer may not wish to fulfill orders for or have orders fulfilled by a local rival, while a more distant product supplier would pose comparatively little competitive threat. The system may be programmed to take such selections into account when attempting to locate products for delivery to product purchasers. The system may be similarly programmed to enable a participating product supplier to select: a subset of products available for delivery from other participating product suppliers; and a subset of products available for delivery to fulfill orders placed with other participating product suppliers. For example, a product retailer specializing in children's books and videos would not wish to include adult-oriented products as available for ordering and delivery, and would presumably not select such products for availability from another participating product supplier's inventory.

In order to further protect the autonomy of participating product suppliers, systems and methods according to the present invention may be implemented in such a way as to conceal the identities of the participating product suppliers from each other (particularly retailers from other retailers), and also to at least partly conceal the identities of fulfilling product suppliers and product purchasers from each other. For example, a product supplier may wish to conceal from a customer the identity of the fulfilling supplier, so that the customer will not shift business to the fulfilling supplier. Similarly, at least partly concealing the identity of the purchaser from the fulfilling product supplier may hamper efforts by the fulfilling product supplier to lure the purchaser away. Such identity concealment may be imposed on all participating product suppliers and/or purchasers, or may be activated selectively for/by each participating product supplier. Identities could not be completely concealed at all levels of the system, since ultimately the accounting records generated by transactions and exchanges must show where revenues are to be directed. Independent and presumably neutral and impartial system administration could be implemented to insure protection of participating product supplier identities, if desired. Such a centralized administration system could be further programmed to mediate the financial transactions generated by product orders and fulfillment.

Systems and methods implemented according to the present invention may be used to achieve dynamic, automated, real-time adjustments to order fulfillment and/or product delivery, product pricing, local and/or remote product inventory, and/or other adjustments among the participating product suppliers in response to changing market conditions, sales trends, product demand patterns, or other conditions. For example, in choosing a participating product supplier for order fulfillment, the system may be further programmed to query the selected product supplier some time after the initial delivery instructions were issued. If delivery has not been initiated for some reason (examples: product not available due to inaccurate inventory information; equipment failure; bad weather; etc), then the system may be programmed to cancel the original delivery instructions and find a secondary product supplier to fulfill the order. The system may be programmed to monitor participating product supplier product local inventory information in supplier database 210 and automatically initiate inventory transfers between participating product suppliers to restore and/or maintain appropriately balanced local inventory levels. Target local inventory levels may preferably be set by each participating product supplier independently of other participating product suppliers. Local inventories thus maintained are available for in-store direct product sales as well as delivery to ordering product purchasers, and in-store direct product sales may preferably be included in the product inventory data in the product supplier database 210 for participating product suppliers offering such direct sales. A participating product supplier having both a physical location and an online presence may achieve integrated management of inventory, sales, and distribution of each. The system may be programmed to monitor sales patterns and to make appropriate adjustments to product pricing, based once again on parameters that may preferably be set by each participating product supplier independently of other participating product suppliers. The databases 210 and/or 220 would be automatically updated to reflect such inventory and/or pricing adjustments. As with other capabilities of the present invention involving interactions/exchanges between participating product suppliers, the system may be programmed to enable a participating product supplier to select a subset of other participating product suppliers for inventory transfers/adjustments, pricing adjustments, and/or other adjustments, and/or to enable a participating product supplier to engage in such interactions while maintaining a concealed identity.

These inventory and/or pricing adjustment methods may be particularly useful when implemented on a retailer-to-retailer basis. Another significant implementation would apply to inventories of used, rare, out-of-production, collectible, and/or otherwise non-standard products, wherein supply/demand considerations may create significantly larger price and inventory fluctuations than would be typical for new products, and wherein product sales volumes are likely to be lower than for new products. Such non-standard products are typically acquired by local/regional retailers, but under prior inventory, sales, and distribution systems would only be available for purchase from the acquiring retailer, and each acquiring retailer would be limited to offering for sale its own local inventory of such products. Implementation of inventory, sales, and distribution of such non-standard products according to the present invention enables each acquiring local/regional retailer (or other acquiring participating supplier) to offer for sale a vastly broader inventory of non-standard products (the combined inventory of non-standard products of the participating product suppliers are listed in the supplier database), and to offer its own local inventory of non-standard products to a vastly broader audience of potential purchasers. The system may be programmed to further enable a participating product supplier to accept bids from potential product purchasers for a used, rare, out-of-production, collectible, and/or otherwise non-standard products, and such bids (preferably from multiple bidders bidding at multiple participating product suppliers) may be included in the databases and used (along with previous sale data) by the system to set prices for such non-standard products.

The music and video industries offer particularly compelling opportunities for implementation of systems and methods according to the present invention, particularly when applied to used, out-of-production, and/or private-label products. Large chains and large online retailers do not typically deal in such non-standard products, which as a result are substantially restricted to local/regional retailers. Currently there exists no mechanism enabling a local/regional record or video store to offer its inventory of such non-standard products beyond its own audience of customers. Furthermore, there exists no mechanism for enabling a local/regional retailer to find and offer such non-standard products beyond its own local inventory. Implementation of systems and methods according to the present invention radically alters the situation. Product identifying information, product inventory information, and product pricing information for used, out-of-production, and/or private label music and/or video products may be listed in supplier database 210 alongside new products. The local inventory of non-standard music/video products of any participating local/regional retailer is therefore available to other participating product suppliers and may be offered to a wider array of music/video purchasers. Similarly, any local/regional retailer may offer for sale a vastly 11 broader selection of non-standard music/video products to its customers. The potential number of music/video products newly made broadly available through implementation of the systems and methods of the present invention may easily number several hundred thousand titles, compared to the roughly 200,000 titles currently broadly available as new products. A few dozen local record stores implementing the system of the present invention may thereby actively compete on a more level playing field against giant chains such as Sam Goody, Tower Records, Best Buy, Circuit City, Wherehouse, and so on, or against giant online retailers such as Amazon.com, CDNow.com, and so on.

Systems and methods implemented according to the present invention may offer further advantages for inventory, sales, and distribution of used, rare, out-of-production, and/or collectible products. It is frequently the case that such items are required in smaller quantities than new products, thereby increasing shipping costs per unit. This may be mitigated in the present invention if a participating product supplier uses the system to provide a so-called "just-in-time" consignment service. Participating product suppliers that have acquired used, out-of-production, private label, or other non-standard products supply the appropriate information to databases 210 and 220. Analysis of databases 210 and 220 for inventory/demand/sales patterns for a non-standard product is used to trigger acquisition on consignment of the product from other participating product suppliers, so that the consignment product supplier always has a ready local inventory of the used, rare, out-of-production, and/or collectible item on hand for delivery along with other, standard products, thereby reducing fulfillment costs associated with a typical widely-dispersed remote inventory of non-standard products. Financial transfers/revenue flow in this scheme may be direct between participating suppliers, indirect and system-mediated, and/or indirect and mediated by the consignment product supplier. The "just-in-time consignment scheme described herein is a variation of the local inventory and pricing adjustment schemes described hereinabove, applied specifically to used, out-of-production, private label, and/or other non-standard music/video products. In addition, apparatus and methods for quality evaluation may be implemented for evaluating used products and appropriately adjusting prices or rejecting damaged/defective products.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising", "including", and "having" shall be construed as open ended terminology, with the same meaning as if the phrase "at least" were appended after each instance thereof.

What is claimed is:

1. A multiply-integrated system for product inventory, sales, and distribution, comprising:
   (a) a supplier database, the supplier database including product identifying information, product inventory information, and product pricing information for multiple independent participating product suppliers, wherein
      (i) the multiple independent participating product suppliers can include any of participating product manufacturers, participating product distributors, and participating product retailers,
      (ii) the multiple independent participating product suppliers include at least one participating product distributor and at least one participating product retailer,
      (iii) the multiple independent participating product suppliers include at least two participating product distributors or at least two participating product retailers, and
      (iv) the multiple independent product suppliers offer products of a common product category;
   (b) an order database, the order database including order information pertaining to
      (i) pending orders placed with multiple participating product suppliers by multiple independent product purchasers, wherein the multiple independent product purchasers may include any of participating product manufacturers, participating product distributors, participating product retailers, non-participating product manufacturers, non-participating product distributors, non-participating product retailers, and retail product purchasers, and (ii) fulfilled orders placed with multiple participating product suppliers by multiple product purchasers and fulfilled by the multiple participating product suppliers;

and (c) a programmed computer processor operatively linked to the supplier database and the order database, the computer processor being programmed for (i) automatically receiving product identifying information, product pricing information, and product inventory information from the multiple participating product suppliers and entering the information into the supplier database, (ii) automatically receiving, from multiple participating product suppliers, order information pertaining to orders placed by multiple product purchasers with the multiple participating product suppliers, (iii) automatically entering the received order information into the order database, (iv) automatically searching, for each order placed by each product purchaser, the supplier database to attempt to locate each ordered product listed in the placed order and available for delivery from a corresponding participating product supplier, (v) automatically transmitting instructions for delivery, for each order placed by each product purchaser, of each ordered and located product to the product purchaser from the corresponding participating product supplier, thereby fulfilling the order, wherein (A) the computer processor is programmed to transmit at least a portion of the delivery instructions for order fulfillment to one participating product retailer in response to an order placed with another of the participating product retailers, or (B) the computer processor is programmed to transmit at least a portion of the delivery instructions for order fulfillment to one participating product distributor in response to an order placed with or delivery instructions received by another of the participating product distributors, (vi) automatically updating order information in the order database pertaining to each delivered product, (vii) automatically updating the product inventory information pertaining to each delivered product in the supplier database, and (viii) automatically creating a financial accounting record for each delivered product.

2. The system of claim 1, wherein the multiple independent participating product suppliers may further include product content providers.

3. The system of claim 1, wherein the computer processor is further programmed for automatically transmitting instructions for shipment of a delivered product from a corresponding participating product supplier to the participating product supplier with whom the product purchaser placed the order.

4. The system of claim 3, wherein:

(a) the corresponding participating product supplier is a participating product retailer;

and (b) the participating product supplier with whom the product purchaser placed the order is a participating product retailer.

5. The system of claim 1, wherein the computer processor is further programmed for automatically transmitting instructions for shipment of a delivered product from a corresponding participating product supplier to the product purchaser.

6. The system of claim 5, wherein:

(a) the corresponding participating product supplier is a participating product retailer;

and (b) the participating product supplier with whom the product purchaser placed the order is a participating product retailer.

7. The system of claim 1, wherein the computer processor is further programmed for:

(a) enabling a first participating product supplier to select an eligible subset of the multiple participating product suppliers from which ordered products, listed in orders placed with the first participating supplier, may be delivered to a product purchaser;

or (b) enabling the first participating product supplier to select an eligible subset of products available from another of the multiple participating product supplier from which ordered products, listed in orders placed with the first participating supplier, may be delivered to a product purchaser.

8. The system of claim 1, wherein the computer processor is further programmed for:

(a) enabling a first participating product supplier to select an eligible subset of the multiple participating product suppliers for which ordered products, listed in orders placed with the eligible subset of the multiple participating product suppliers, are available for delivery to a product purchaser;

or (b) enabling the first participating product supplier to select an eligible subset of products available from the first participating product supplier from which ordered products, listed in orders placed with another of the multiple participating product suppliers, are available for delivery to a product purchaser.

9. The system of claim 1, wherein the product inventory information is stored in the supplier database in a search table common to the multiple participating product suppliers.

10. A multiply-integrated system for product inventory, sales, and distribution, comprising:

(a) a retailer database, the retailer database including product identifying information, product inventory information, and product pricing information for multiple independent participating product retailers, wherein the multiple independent product retailers offer products of a common product category;

(b) an order database, the order database including order information pertaining to (i) pending orders placed with multiple participating product retailers by multiple independent product purchasers, wherein the multiple independent product purchasers may include any of participating product manufacturers, participating product distributors, participating product retailers, non-participating product manufacturers, non-participating product distributors, non-participating product retailers, and retail product purchasers, and (ii) fulfilled orders placed with multiple participating product retailers by multiple product purchasers and fulfilled by the multiple participating product retailers;

and (c) a programmed computer processor operatively linked to the retailer database and the order database, the computer processor being programmed for
  (i) automatically receiving product identifying information, product pricing information, and product inventory information from the multiple participating product retailers and entering the information into the retailer database,
  (ii) automatically receiving, from multiple participating product retailers, order information pertaining to orders placed by multiple product purchasers with the multiple participating product retailers,
  (iii) automatically entering the received order information into the order database,
  (iv) automatically searching, for each order placed by each product purchaser, the retailer database to attempt to locate each ordered product listed in the placed order and available for delivery from a corresponding participating product retailer,
  (v) automatically transmitting instructions for delivery, for each order placed by each product purchaser, of each ordered and located product to the product purchaser from the corresponding participating product retailer, thereby causing fulfillment of the order, wherein at least a portion of the delivery instructions for order fulfillment are transmitted to one participating product retailer in response to an order placed with another of the participating product retailers;
  (vi) automatically updating order information in the order database pertaining to each delivered product,
  (vii) automatically updating the product inventory information pertaining to each delivered product in the retailer database,
  and
  (viii) automatically creating a financial accounting record for each delivered product.

11. A multiply-integrated system for product inventory, sales, and distribution, comprising:
  (a) a supplier database, the supplier database including product identifying information, product inventory information, and product pricing information for multiple independent participating product suppliers, wherein
    (i) the multiple independent participating product suppliers may include any of participating product manufacturers, participating product distributors, and participating product retailers,
    and
    (ii) the multiple independent product suppliers offer products of a common product category;
  (b) an order database, the order database including order information pertaining to
    (i) pending orders placed with multiple participating product suppliers by multiple independent product purchasers, wherein the multiple independent product purchasers may include any of participating product manufacturers, participating product distributors, participating product retailers, non-participating product manufacturers, non-participating product distributors, non-participating product retailers, and retail product purchasers,
    and
    (ii) fulfilled orders placed with multiple participating product suppliers by multiple product purchasers and fulfilled by the multiple participating product suppliers;
  and (c) a programmed computer processor operatively linked to the supplier database and the order database, the computer processor being programmed for
  (i) automatically receiving product identifying information, product pricing information, and product inventory information from the multiple participating product suppliers and entering the information into the supplier database,
  (ii) automatically receiving, from multiple participating product suppliers, order information pertaining to orders placed by multiple product purchasers with the multiple participating product suppliers,
  (iii) automatically entering the received order information into the order database,
  (iv) automatically searching, for each order placed by each product purchaser, the supplier database to attempt to locate each ordered product listed in the placed order and available for delivery from a corresponding participating product supplier,
  (v) automatically transmitting instructions for delivery, for each order placed by each product purchaser, of each ordered and located product to the product purchaser from the corresponding participating product supplier, thereby fulfilling the order,
  (vi) automatically updating order information in the order database pertaining to each delivered product,
  (vii) automatically updating the product inventory information pertaining to each delivered product in the supplier database,
  and
  (viii) automatically creating a financial accounting record for each delivered product,
  wherein the computer processor is further programmed for:
  (ix) enabling a first participating product supplier to conceal its identity from a selected subset of the multiple participating product suppliers for which ordered products, listed in orders placed with the eligible subset of the multiple participating product suppliers, are available for delivery from the first participating product supplier to a product purchaser;
  (x) enabling the first participating product supplier to conceal its identity from a selected subset of the multiple participating product suppliers from which ordered products, listed in orders placed with the first participating supplier, may be delivered to a product purchaser;
  or
  (xi) enabling the first participating product supplier to conceal the identity of a product purchaser from another participating product supplier from which an ordered product, listed in an order placed with the first participating provider by the product purchaser, is delivered to the product purchaser.

12. A multiply-integrated system for product inventory, sales, and distribution, comprising:
  (a) a supplier database, the supplier database including product identifying information, product inventory information, and product pricing information for multiple independent participating product suppliers, wherein
    (i) the multiple independent participating product suppliers may include any of participating product manufacturers, participating product distributors, and participating product retailers,
    and (ii) the multiple independent product suppliers offer products of a common product category;

(b) an order database, the order database including order information pertaining to (i) pending orders placed with multiple participating product suppliers by multiple independent product purchasers, wherein the multiple independent product purchasers may include any of participating product manufacturers, participating product distributors, participating product retailers, non-participating product manufacturers, non-participating product distributors, non-participating product retailers, and retail product purchasers, and (ii) fulfilled orders placed with multiple participating product suppliers by multiple product purchasers and fulfilled by the multiple participating product suppliers;

and (c) a programmed computer processor operatively linked to the supplier database and the order database, the computer processor being programmed for (i) automatically receiving product identifying information, product pricing information, and product inventory information from the multiple participating product suppliers and entering the information into the supplier database, (ii) automatically receiving, from multiple participating product suppliers, order information pertaining to orders placed by multiple product purchasers with the multiple participating product suppliers, (iii) automatically entering the received order information into the order database, (iv) automatically searching, for each order placed by each product purchaser, the supplier database to attempt to locate each ordered product listed in the placed order and available for delivery from a corresponding participating product supplier, (v) automatically transmitting instructions for delivery, for each order placed by each product purchaser, of each ordered and located product to the product purchaser from the corresponding participating product supplier, thereby fulfilling the order, (vi) automatically updating order information in the order database pertaining to each delivered product, (vii) automatically updating the product inventory information pertaining to each delivered product in the supplier database, and (viii) automatically creating a financial accounting record for each delivered product, wherein the computer processor is further programmed for automatically adjusting local product inventory for the multiple participating product suppliers by:

(ix) automatically monitoring in real time local product inventory information in the supplier database, (x) in response to local product inventory information in the supplier database, automatically transmitting instructions for transfer of products out of local product inventory of a first participating product retailer into local product inventory of a second participating product retailer, and (xi) in response to the transfer of local product inventory, automatically updating the local product inventory information in the supplier database.

13. The system of claim 12, wherein the transferred local product inventory includes used product, rare product, collectible product, private-label product, or out-of-production product.

14. The system of claim 13, wherein the computer processor is further programmed for consigning to the second participating product retailer transferred used product, rare product, collectible product, private-label product, or out-of-production product.

15. The system of claim 12, wherein the computer processor is further programmed for:

(a) enabling the first participating product retailer to select an eligible subset of the multiple participating product retailers to which product inventory may be transferred; or (b) enabling the second participating product retailer to select an eligible subset of the multiple participating product retailers from which product inventory may be transferred.

* * * * *